(12) United States Patent
Kalkere et al.

(10) Patent No.: US 10,133,537 B2
(45) Date of Patent: Nov. 20, 2018

(54) METHOD OF INTEGRATING A HOME ENTERTAINMENT SYSTEM WITH LIFE STYLE SYSTEMS WHICH INCLUDE SEARCHING AND PLAYING MUSIC USING VOICE COMMANDS BASED UPON HUMMING OR SINGING

(71) Applicant: Honeywell International Inc., Morristown, NJ (US)

(72) Inventors: Giridhara Nagaraj Kalkere, Karnataka (IN); Bharat Balaso Khot, Karnataka (IN); Mallikarjun Uppena, Pradesh (IN); Bharath Kallali Narayana, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 243 days.

(21) Appl. No.: 14/496,068

(22) Filed: Sep. 25, 2014

(65) Prior Publication Data

US 2016/0092157 A1 Mar. 31, 2016

(51) Int. Cl.
*G06F 17/00* (2006.01)
*G06F 3/16* (2006.01)
(Continued)

(52) U.S. Cl.
CPC ............ *G06F 3/165* (2013.01); *G05B 15/02* (2013.01); *G10H 1/00* (2013.01); *G10H 1/0008* (2013.01);
(Continued)

(58) Field of Classification Search
CPC ......... G06F 17/30758; G06F 17/30743; G06F 17/3074; G10L 15/26; G10H 2210/061;
(Continued)

(56) References Cited

U.S. PATENT DOCUMENTS

2002/0038597 A1* 4/2002 Huopaniemi ..... G06F 17/30743
84/609
2006/0075884 A1 4/2006 Streitenberger et al.
(Continued)

FOREIGN PATENT DOCUMENTS

EP 1 403 852 A1 3/2004
EP 1 785 891 A1 5/2007
(Continued)

OTHER PUBLICATIONS

Extended European search report for corresponding EP patent application 15186338.8, dated Jan. 8, 2016.
(Continued)

*Primary Examiner* — Fan Tsang
*Assistant Examiner* — David Siegel
(74) *Attorney, Agent, or Firm* — Husch Blackwell LLP

(57) ABSTRACT

An apparatus including a home automation system, a memory device of the home automation system containing a plurality of musical performances, a processor that recognizes a command from a user to play one of a plurality of musical performances and a processor that receives a verbal input at least partially mimicking a portion of one or more of the plurality of musical performances from the user, matches the verbal input with one or more of the plurality of musical performances and plays a matching musical performance.

16 Claims, 2 Drawing Sheets

(51) Int. Cl.
*G10H 1/00* (2006.01)
*G10L 15/26* (2006.01)
*G05B 15/02* (2006.01)
*H04L 12/28* (2006.01)
*G10L 25/54* (2013.01)

(52) U.S. Cl.
CPC .............. *G10L 15/26* (2013.01); *G10L 25/54* (2013.01); *H04L 12/2803* (2013.01); *G10H 2210/061* (2013.01); *G10H 2210/071* (2013.01); *G10H 2220/011* (2013.01); *G10H 2220/091* (2013.01); *G10H 2230/015* (2013.01); *G10H 2240/131* (2013.01); *G10H 2240/141* (2013.01)

(58) Field of Classification Search
CPC ....... G10H 2230/015; G10H 2240/131; G10H 2240/141; H04L 12/2803; H04L 2012/2849
See application file for complete search history.

(56) References Cited

U.S. PATENT DOCUMENTS

| | | | |
|---|---|---|---|
| 2009/0157685 A1* | 6/2009 | Sorensen | G06F 17/30029 |
| 2009/0173214 A1 | 7/2009 | Eom et al. | |
| 2011/0137757 A1* | 6/2011 | Paolini | G06Q 30/0641 |
| | | | 705/27.1 |
| 2011/0268284 A1* | 11/2011 | Arimoto | G10H 1/0008 |
| | | | 381/56 |
| 2014/0188484 A1 | 7/2014 | Huang et al. | |
| 2014/0344956 A1* | 11/2014 | Garben | G06F 21/10 |
| | | | 726/30 |

FOREIGN PATENT DOCUMENTS

| | | |
|---|---|---|
| JP | 2004-265376 | 9/2004 |
| JP | 2007-183921 | 7/2007 |
| KR | 10-2009-0076083 | 7/2009 |
| KR | 10-2013-0031562 | 3/2013 |

OTHER PUBLICATIONS

Cabasse, Play your music with StreamCONTROL, URL: http://www.cabasse.com/documents/StreamCONTROLus.pdf, Dec. 9, 2013, pp. 1-6.

Friedewald et al., Perspectives of ambient intelligence in the home environment, Telematics and Informatics, Aug. 1, 2005, pp. 221-238, vol. 22, No. 3, Oxford, GB.

English-language abstract for JP 2004-265376, publication date Sep. 24, 2004.

English-language abstract for JP 2007-183921, publication date Jul. 19, 2007.

English-language abstract for KR 10-2013-0031562, publication date Mar. 29, 2013.

English-language abstract for KR 10-2009 0076083, publication date Jul. 13, 2009.

Examination report from corresponding EP patent application 15186338.8, dated Jul. 26, 2017.

Examination report for corresponding EP patent application 15186338.8, dated Mar. 13, 2018.

* cited by examiner

METHOD OF INTEGRATING A HOME ENTERTAINMENT SYSTEM WITH LIFE STYLE SYSTEMS WHICH INCLUDE SEARCHING AND PLAYING MUSIC USING VOICE COMMANDS BASED UPON HUMMING OR SINGING

FIELD

This application relates to home automation and security systems and more particular to the automation of such systems.

BACKGROUND

Systems are known to automate the homes of people. For example, security systems are known to automate the protection of people and assets within secured areas. Such systems may include a number of sensors placed throughout the area to detect and automatically report breaches in security.

Alternatively, one or more timers and/or sensors may be provided to automate and control illumination. For example, a timer may activate lighting at sunset and deactivate the lighting at sunrise. Similarly, a timer may be coupled to an environmental control system to lower heating and/or cooling costs during periods when the area is unoccupied.

Further efforts to automate such areas may include the use of sensors intended to detect the presence or absence of people. For example, passive infrared (PIR) sensor may be placed near the entrance to a room and used to activate the lighting when a person enters the room.

Alternatively, a number of sensors may be placed throughout a space and coupled to a central processor. The processor may operate to learn a schedule of normal occupancy of the space. Towards this end, the processor may collect data on use of the space over a number of 24 hour, 7 day a week periods to learn a schedule of normal occupancy by authorized persons. Once the normal schedule of occupancy has been learned, the processor may control heating, cooling and lighting systems appropriately.

In many cases, the control of home automation may require any of a number of different control devices. For example, a security system may be controlled via one interface while temperature may be controlled via a separate wall-mounted interface. Because of the importance of automating occupied spaces, a need exists for better methods of automating the diverse systems in such spaces.

DETAILED DESCRIPTION

Figure 1:
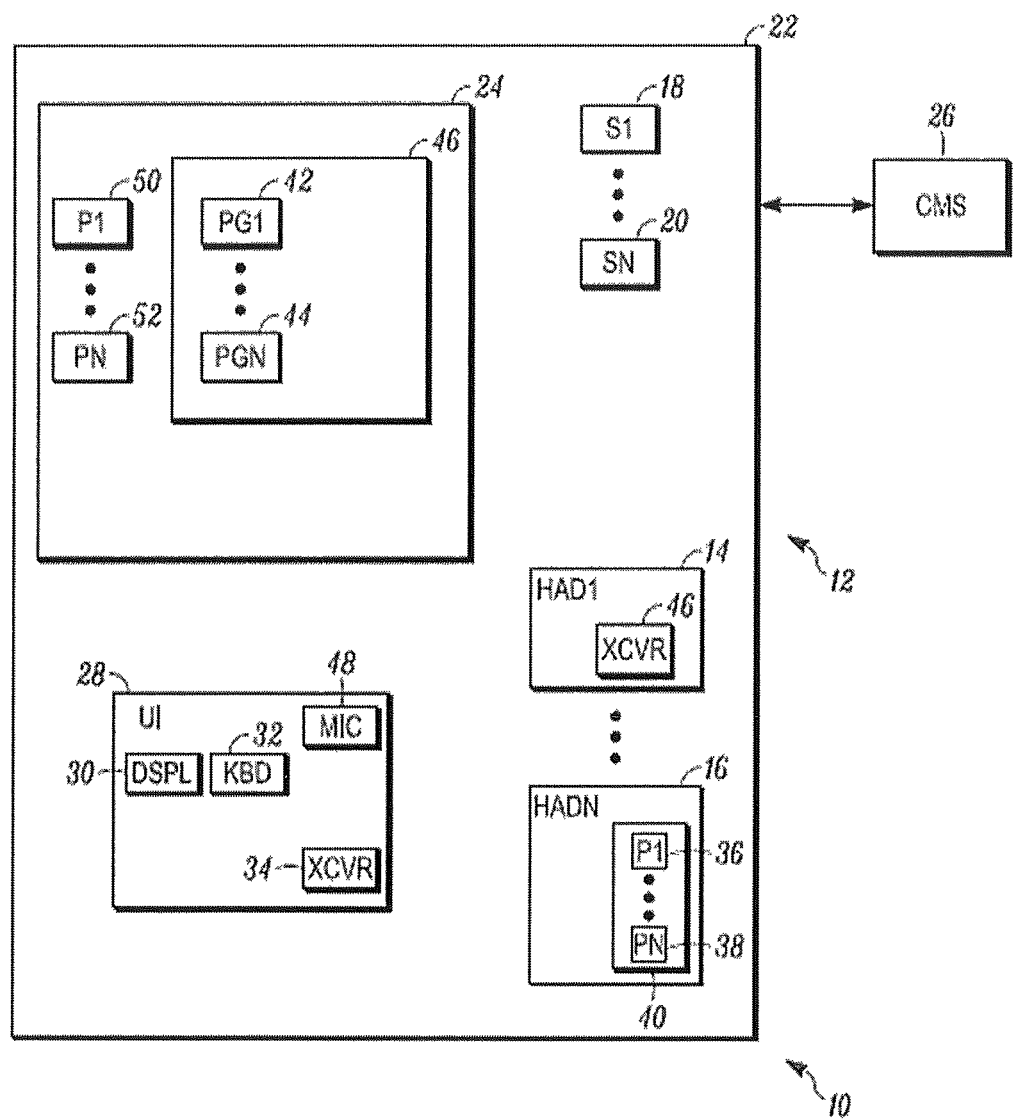
FIG. 1 illustrates a block diagram of a home automation system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a block diagram of a home automation system 10 shown generally in accordance with an illustrated embodiment. Included within the home automation system may be a security system 12 and a number of other home automation devices 14, 16.

The security system may include a number of sensors 18, 20 used to detect threats within a secured area 22 of the home. The sensors may be monitored by a control panel 24. Upon detecting activation of one of the sensors, the control panel may compose and send an alarm message to a central monitoring station 26.

The other home automation devices 14, 16 may be used to independently control any of a number of different environmental and/or entertainment systems within the home. For example, at least one of the other home automation devices may be used to control lighting in one or more rooms of the home. Another home automation device may be used to control temperature within each of the rooms or the entire home. Still another home automation device may control an audio entertainment center.

Figure 2:
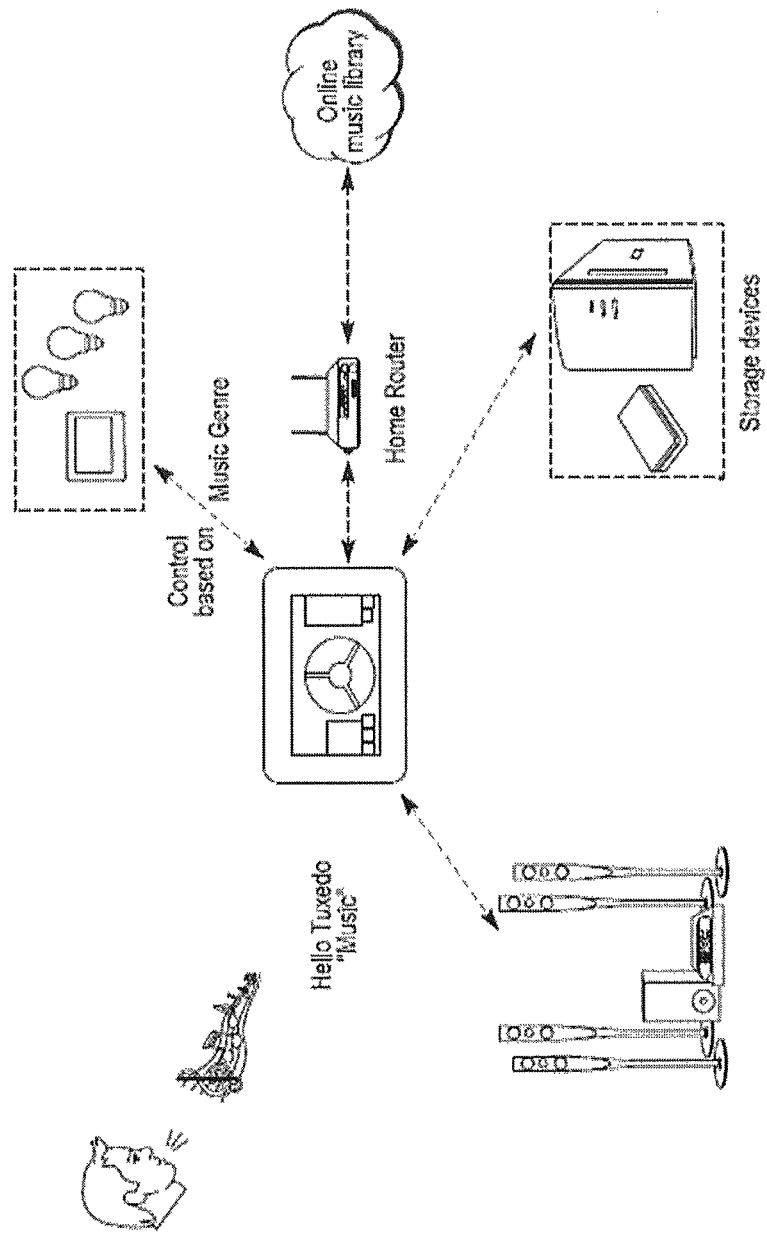
FIG. 2 is a simplified view of the system of FIG. 1.

The home automation system also includes a portable user interface 28. The user interface may be wirelessly coupled to the security system and other home automation devices via a transceiver 34 within the user interface and a corresponding respective transceiver 46 within the security system and each of the other home automation devices. FIG. 2 shows a more general connection diagram of the system.

Included within the portable user interface, and each of the home automation devices 12, 14, 16 is a number of processor apparatus (processors) 50, 52. Each processor may operate under control of one or more computer programs 42, 44 loaded from a non-transient computer readable medium (memory) 46. As used herein, reference to a step performed by a computer program is also reference to the processor that executed that step of the program.

An interface processor within the portable device and/or each of the security system and other home automation devices may present a respective home automation device interface on the display 30 of the portable user device. The content and operation of the respective interface is appropriate for the home automation device controlled by the interface. For example, the interface for the security system may include command inputs (e.g., control buttons) such as ARMED AWAY, ARMED STAY, DISARM, status, etc.). The control buttons may be defined keys on the keyboard 32 or softkeys depicted on the display. The interface may also include a status display window that, in the case of a security system, may show the status of the security system, any activated sensors and an alarm history.

The interface process or processor may also include a word recognition processor. The word recognition processor may, in part or in total, operate in place of the input device (e.g., keyboard). For example, a user may simply say the words "security system." In this case, a microphone 48 may detect the spoken words and couple the words to the word recognition processor. The word recognition processor may recognize the words as an instruction to display the interface for the security system. The user may then say the word "ARM." In response, the interface process may transfer the arm command to the security system and the security system may automatically arm itself in response to the command. Similarly, the user may disarm or display status information relative to the security system.

Similarly, the interface for a lighting control system may simply include ON and OFF buttons. Alternatively, the lighting control interface may include a dimmer control including a slide switch or level control knob. The user may activate the buttons, slide switch or knob directly or indirectly via spoken words recognized by the word recognition processor.

Similarly, the interface for a thermostat may include up and down buttons for a temperature set point. The interface may also include a temperature indicator of the space controlled by the thermostat.

If the home includes one or more home entertainment devices, then a separate home automation interface may be provided on the portable device for each type of home entertainment device. For example, one of the home automation devices may be an interface to an audio entertainment system. In this case, the interface may provide a button for each source of audio entertainment (e.g., AM radio, FM radio, playing previously recorded performances, etc.). The user may activate the buttons directly or indirectly via spoken words recognized by the word recognition processor.

For example, the user can activate the audio entertainment system by saying the words "play music." Once activated, the user can select a particular performance by reciting the title or by humming the tune of or singing the words from a particular performance. Where the user recites the title, the word recognition processor recognizes the spoken words and searches for those words in the entertainment files 36, 38 saved within a memory 40 of the entertainment device.

The word recognition processor may also form a library of words from each entertainment file. The word recognition processor may perform the step of recognizing each word associated with a performance off line in order to form a template for later comparing a song sung by the user with the content of the performance files.

In addition, a second tone processor may form a tone signature library for each entertainment file. The tone signature represents a signature of the musical notes that define the entertainment file. In the case of an entertainment file containing many sources of sound (e.g., an orchestra), the processor may average all of the detected frequencies at each instant to form a rolling average frequency across some progressive time frame that defines the characteristic of the audio content. The average may be saved as the tone signature.

Accordingly, a user may simply provide a verbal input to identify a performance where the user simply hums or sings a portion of the audio content of the entertainment file. In effect, the humming or singing mimics at least a portion of the performance of the file. In the case of humming, the tone processor may form a tone signature of the humming from the user and perform a rolling comparison with the tone signature of each entry within the tone library. The tone processor may form a list of performances (e.g., titles) that are possible matches from the comparison with the best match listed first. The tone processor may display the list on the portable device. The user may select his/her intended choice and the entertainment device may automatically begin playing the selected entry.

Similarly, when the user sings part of a file, the word recognition and tone processor may each form a respective template that may be used independently to form matches based upon both approaches. Duplicates between the two lists may be regarded as the best or most likely choices.

Among other things, the system is directed to solving the basic problem of searching for music in digital storage devices. Normally, a user may have a large collection of music in local hard drives and centralized network drives. It takes an inordinate amount of time to search a particular music source and then to play a selection. The system solves this problem and also solves the problem of controlling the music system in a totally hands-free manner.

Users can search for an intended song simply by using a voice command followed by humming or singing the song. This provides a very gratifying user experience. The user has no need to touch any electronic device. The system is totally hands-free. This can be used to automatically control life style systems based on the genre of the music playing. This system benefits music producers because it can be used to give positive suggestions for buying the music online.

In the case of previously recorded performances, the entertainment system may include a memory 40 including a respective file 36, 38 for each of a number of performances. The files may include audio or audio/visual information.

The system of FIGS. 1 and 2 facilitates the evolution of and continue the trend in home automation systems where every electronic system and device is connected to each other. Under illustrated embodiments, it is possible that home automation devices (e.g., appliances, surveillance cameras, music systems, television systems, home computers, digital storage devices, etc.) are connected to each other via the portable device such as shown in FIGS. 1 and 2. At least some automation devices have previously been used to control lights, locks and thermostats with voice commands. The present system can also be used to integrate home entertainment systems and to search and play music.

The system of FIGS. 1 and 2 provides an enhanced user experience and increases the comfort level of the user by providing a mechanism to search music stored in any digital storage device in a very convenient manner using voice commands and to play results in a connected music system. Control of other life style systems (e.g., lighting, window shades, etc.) based upon the genre of the music is also possible.

In general, the system includes a home automation system, a memory device of the home automation system containing a plurality of musical performances, a processor that recognizes a command from a user to play one of a plurality of musical performances and a processor that receives a verbal input at least partially mimicking a portion of one or more of the plurality of musical performances from the user, matches the verbal input with one or more of the plurality of musical performances and plays a matching musical performance. The system may also include a portable user interface that receives the command and verbal input from the user, a processor that displays a list of titles of the plurality of musical performances matching the verbal input on a display of the portable user device and/or a processor that receives a selection from the list of titles and plays the selection. The command may further include a spoken word and the processor that recognizes the command further comprises a word recognition processor. The verbal input may further include a sequence of spoken words. The processor that matches the verbal input with one of the plurality of musical performances may further include a processor that compares the sequence of words with a title of a song or with words spoken by a performer during a performance.

Alternatively, the system may include a home automation system, a portable user device that controls the home automation system, a memory device of the home automation system containing a plurality of audio performances and a processor that receives a verbal input from a user through the portable device that at least partially mimics one or more of the plurality of audio performances, the processor matches the verbal input with one or more of the plurality of audio performances and plays a matching performance through a controlled device of the home automation system.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
a home automation system that includes a thermostat;
a memory device of the home automation system that stores a plurality of musical performances and a respective tone signature for each of the plurality of musical performances, wherein the respective tone signature for each of the plurality of musical performances comprises a respective average of all detected frequencies at each instant of a respective one of the plurality of musical performances;
a word recognition processor that forms a respective library of words for each of the plurality of musical performances by recognizing each word spoken by a performer during the respective one of the plurality of musical performances; and
a second processor that recognizes a command from a user to play a selected one of the plurality of musical performances,
wherein the second processor receives a verbal input mimicking a portion of the selected one of the plurality of musical performances from the user, matches the verbal input with the respective tone signature for the selected one of the plurality of musical performances when the verbal input comprises humming, matches the verbal input with the respective library of words for the selected one of the plurality of musical performances when the verbal input comprises spoken or sung words, and plays a matching one of the plurality of musical performances, and
wherein the second processor controls the thermostat based on a genre of the matching one of the plurality of musical performances.

2. The apparatus as in claim 1 further comprising a portable user interface that receives the command and the verbal input from the user.

3. The apparatus as in claim 2 wherein the portable user interface displays a list of titles of the plurality of musical performances matching the verbal input on a display of the portable user interface.

4. The apparatus as in claim 3 wherein the second processor receives a selection from the list of titles and plays the selection.

5. The apparatus as in claim 2 wherein the second processor performs word recognition when the verbal input comprises the spoken or sung, words.

6. The apparatus as in claim 1 further comprising an audio entertainment center that plays the matching one of the plurality of musical performances.

7. The apparatus as in claim 1 further comprising an audio/visual system that plays the matching one of the plurality of musical performances.

8. The apparatus as in claim 1 wherein the verbal input comprises a varying audio tone caused by the user humming or singing an audio portion of the selected one of the plurality of musical performances.

9. An apparatus comprising:
a home automation system that includes a thermostat;
a portable user device that controls the home automation system;
a memory device of the home automation system that stores a plurality of audio performances and a respective tone signature for each of the plurality of audio performances, wherein the respective tone signature for each of the plurality of audio performances comprises a respective average of all detected frequencies at each instant of a respective one of the plurality of audio performances;
a word recognition processor that forms a respective library of words for each of the plurality of audio performances by recognizing each word spoken by a performer during the respective one of the plurality of audio performances; and
a second processor that receives a verbal input from a user through the portable user device that mimics a selected one of the plurality of audio performances, matches the verbal input with the respective tone signature for the selected one or more of the plurality of audio performances when the verbal input comprises humming, or matches the verbal input with the respective library of words for the selected one of the plurality of audio performances when the verbal input comprises spoken or sung words, and plays a matching one of the plurality of audio performances through a controlled device of the home automation system,
wherein the second processor controls the thermostat based on a genre of the matching one of the plurality of audio performances.

10. The apparatus as in claim 9 wherein the controlled device comprises an entertainment system.

11. The apparatus as in claim 10 wherein the second processor displays a list of titles of the plurality of audio performances matching the verbal input on a display of the portable user device.

12. The apparatus as in claim 11 wherein the second processor receives a selection from the list of titles from the user and plays the selection.

13. The apparatus as in claim 9 wherein the portable user device receives a command from the user to play a selection from the plurality of audio performances.

14. The apparatus as in claim 13 wherein the second processor performs word recognition when the verbal input comprises the spoken or sung words.

15. The apparatus as in claim 9 wherein the verbal input comprises a varying audio tone caused by the user humming or singing an audio portion of the selected one of the plurality of audio performances.

16. An apparatus comprising:
a plurality of home automation devices including an audio device and a thermostat;
a portable user device that controls the plurality of home automation devices;
a memory device of the audio device that stores a plurality of musical performances and a respective tone signature for each of the plurality of musical performances, wherein the respective tone signature for each of the plurality of musical performances comprises a respective average of all detected frequencies at each instant of a respective one of the plurality of musical performances;

a word recognition processor that forms a respective library of words for each of the plurality of musical performances by recognizing each word spoken by a performer during the respective one of the plurality of musical performances; and a second processor that receives a verbal input from a user through the portable user device that mimics a portion of a selected one of the plurality of musical performances, matches the verbal input with the respective tone signature for the selected one of the plurality of musical performances when the verbal input comprises humming, or matches the verbal input with the respective library of words for the selected one of the plurality of musical performances when the verbal input comprises spoken or sung words, and plays a matching one of the plurality of musical performances through the audio device, wherein the second processor controls the thermostat based on a genre of the matching one of the plurality of musical performances.

\* \* \* \* \*